Sept. 25, 1956 T. M. HARRIS 2,764,005
FOOD SERVICE PLATE
Filed Oct. 20, 1951
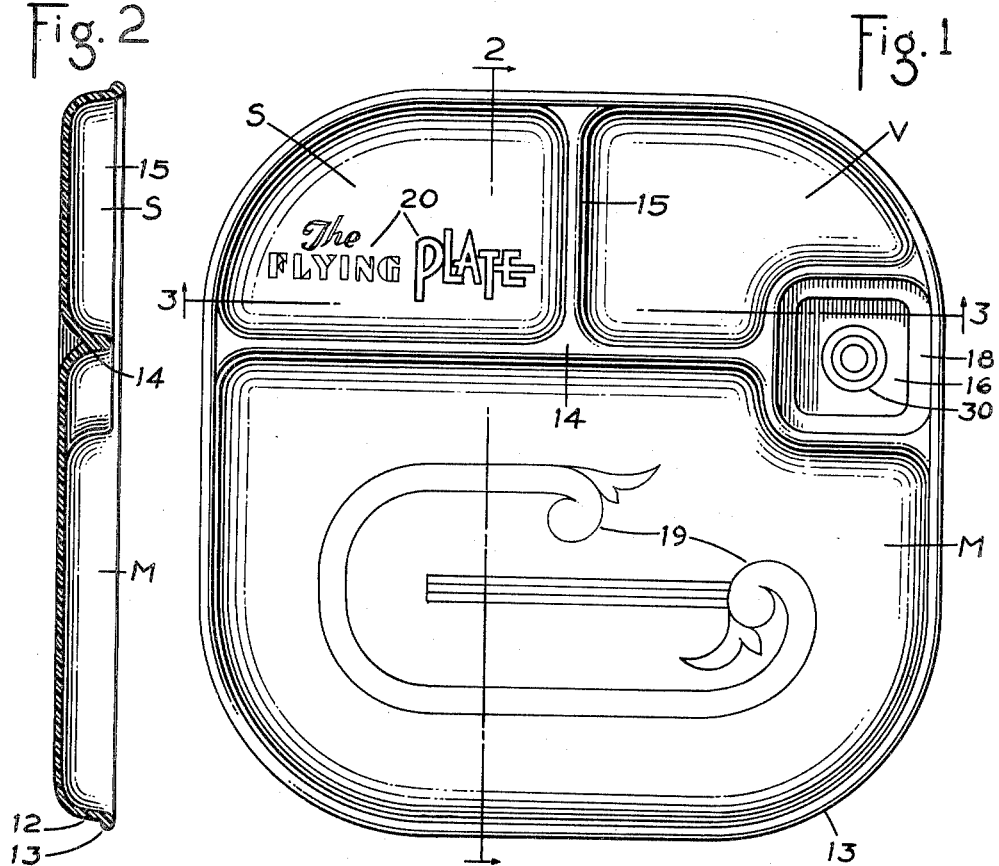
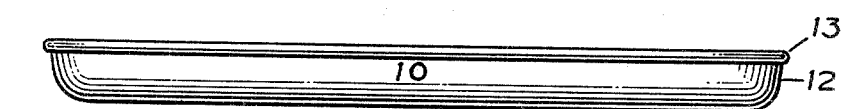
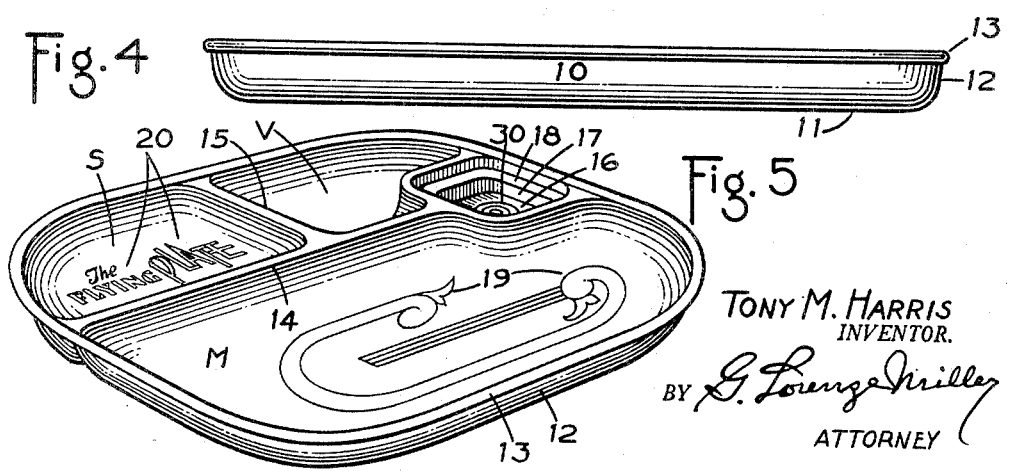
Tony M. Harris
INVENTOR.
BY G. Lorenzo Miller
ATTORNEY

United States Patent Office 2,764,005
Patented Sept. 25, 1956

2,764,005

FOOD SERVICE PLATE

Tony M. Harris, Decatur, Ill.

Application October 20, 1951, Serial No. 252,259

1 Claim. (Cl. 65—15)

This invention relates to a food service tray or plate, the principal use for the same being the transportation of the food from restaurants which send out food on telephone orders.

The tray or plate when delivered from the restaurant to its destination can be used as a service plate, that is the food can be consumed directly therefrom. This is because the tray or plate is preferably made from a plastic although the same could be made from cardboard or any other similar material. The advantage of plastic over cardboard, of course, is that the grease contained within the food will not penetrate the plastic and thereby soil fabric or furniture.

The tray or plate is formed with a series of compartments of graduated size in which the varieties of food are placed, said compartments keeping the respective foods from being mixed during transportation.

The invention, therefore, contemplates a plastic tray or plate which can be used as an efficient transporting receptacle and as a plate when received by the consumer of the food.

Besides the above enumerated advantages, other advantages will be seen as the tray or plate is hereinaftermore fully described and particularly pointed out in the appended claim.

In the drawings, like parts throughout the several views are given similar reference characters and are thus identified in the following description.

Fig. 1 is a top plan view of the tray or plate forming the subject of my invention;

Fig. 2 is a sectional view taken on the line 2—2 of Fig. 1;

Fig. 3 is a sectional view taken on the line 3—3 of Fig. 1;

Fig. 4 is an elevational view of the tray or plate forming the subject matter of my invention;

Fig. 5 is a perspective view thereof.

In the drawings, 10 represents a molded plastic tray or plate, the same being divided into compartments which will be described in detail. The plastic tray or plate 10 is formed with a bottom 11 merging into a circular dished upright side wall 12. On top of the side wall 12 is a reinforcing bead 13 which not only gives strength to the plate but forms an attractive finish for the same.

The tray or plate is divided into a series of graduated compartments, the respective size of the compartments being in keeping with the type of food to be placed therein.

The compartment M, for instance, is used for meats, sea food or the like, and comprises substantially one-half of the tray or plate 10. The compartment M is formed by an upright wall 14, which wall is pressed or molded in the tray or plate while the same is being made.

Extending at right angles to the wall 14 is a like wall 15, which wall in connection with the wall 14 and the side wall 12 of the tray or plate, forms the compartments S and V respectively. The capacity of both of these compartments is approximately the same. For instance, the compartment S is used for salad, cole slaw, etc., while the compartment V is used to receive the vegetable or vegetables being served to complete the meal held in the tray or plate. The upright wall 14 which forms a separation and therefore the wall between the compartments M, and V is forked at one end adjacent the side wall of the tray or plate, said fork being clearly shown in Figs. 1 and 5. Within the fork of the wall 14 and the side wall of the tray is the compartment 16. The compartment 16 has a substantially square outline and extending from the bottom thereof is a vertical wall 17. The top of the wall 17 is approximately one-half the overall height of the tray or plate. On the top of the vertical wall 17 is a right angular flange 18 which extends in an elevated position around the bottom of the compartment 16. From the outside wall of the angular flange 18 the walls of the compartment 16 extend upwardly to the full height of the partitions 14 and 15.

In the bottom of the compartment 16 is placed the butter, preferably in the form of a print for individual serving. On the ledge or shelf 17 of the compartment 16 is placed a serving of bread, either in the form of sliced bread or a roll. The shape of the walls of the compartment 16 therefore forms a receptacle for the individual serving of butter and also means for retaining the bread furnished in a fixed position in the tray or plate, the bread forming a cover, as it were, for the butter while still out of contact with the butter.

Shown on the bottom of the compartment M is an artistic design 19, the same being made by a series of lines impressed in the tray or plate during the molding thereof. In the compartment S is shown the trade name 20 or the origin of the restaurant serving the food. The letters here of the print are likewise formed by a series of letters impressed in the tray or plate during the molding process.

In the bottom of the compartment 16 is a design in the form of three concentric rings 30. These rings 30 are a series of closed lines made in the plate or tray during the molding process.

From the above description in connection with the drawings, it would seem that I have invented a practical tray or plate having compartments therein for the reception of food, said compartments comprising means for retaining the food in each compartment and thereby preventing mixing of the same during handling and transportation.

Further, the invention contemplates a shipping or handling receptacle and an attractive plate when the food has reached its place for consumption.

Normally the tray or plate of my invention with the food thereon is covered by a sheet of paper or placed in a bag or box for transportation from the restaurant to the consumer.

The tray or plate with the food thereon is sent from the restaurant to the consumer with a wrapper of some type together with a plastic knife, fork and spoon to be used by the consumer in eating the food.

From the above it will be seen that the invention contemplates an attractive, cheaply made tray or plate, the cost being such that the tray or plate can be disposed of by the consumer of the food, as the cost of the tray or plate to the restaurant is only nominal. The price of the same does not materially add to the cost of the food delivered on the tray or plate.

What is claimed is:

A shallow plastic tray or plate comprising compartments each of different size, the outer walls of the compartments forming a substantially square plate with rounded corners, the outer walls of said compartments except the outer wall of the smallest compartment being upwardly and outwardly curved, and outer walls of all the compartments terminating in a rounded reinforcing bead extending around the top of the plate, the inner walls of the several compartments forming the partitions, certain partition walls forming in connection with the outside wall of the tray or plate a small substantially square compartment, the side walls forming said small square compartment being of stepped formation, the step in the wall of said square compartment being below the top of the partition walls and below the top of the outside wall of the plate or tray, the depth of all compartments within the tray being the same.

References Cited in the file of this patent

UNITED STATES PATENTS

| | | |
|---|---|---|
| D. 20,487 | McBride | Jan. 20, 1891 |
| D. 72,026 | McCartney | Feb. 15, 1927 |
| D. 88,285 | Blenker | Nov. 15, 1932 |
| D. 122,589 | Bastress | Sept. 17, 1940 |
| D. 132,425 | Erickson | May 19, 1942 |
| 153,221 | Kirchner | July 21, 1874 |
| 231,034 | Goessling | Aug. 10, 1880 |
| 284,244 | Seaman | Sept. 4, 1883 |
| 529,526 | Gaskill | Nov. 20, 1894 |
| 922,495 | Lust | May 25, 1909 |
| 956,858 | Kauffman | May 13, 1910 |
| 1,511,265 | Chilson | Oct. 14, 1924 |
| 1,595,356 | Moseman | Aug. 10, 1926 |
| 1,635,918 | Alaj | July 12, 1927 |
| 1,881,873 | Newcomb | Oct. 11, 1932 |
| 2,107,381 | Leppke | Feb. 8, 1938 |
| 2,336,699 | Neth et al. | Dec. 14, 1943 |
| 2,549,440 | Erro | Apr. 17, 1951 |